C. L'ENFANT.
BILL FOLD.
APPLICATION FILED AUG. 20, 1921.
1,423,669.
Patented July 25, 1922.
4 SHEETS—SHEET 1.
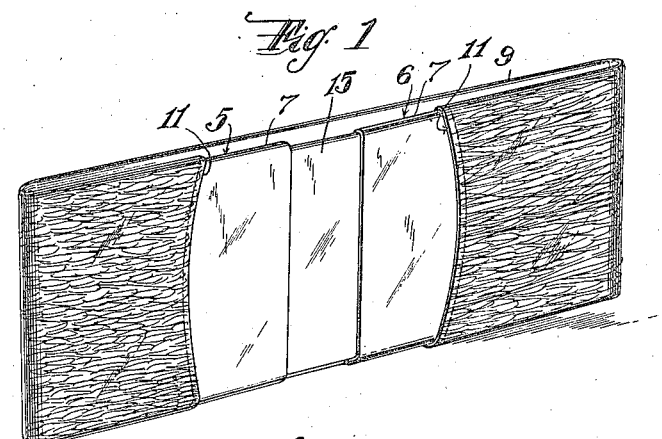
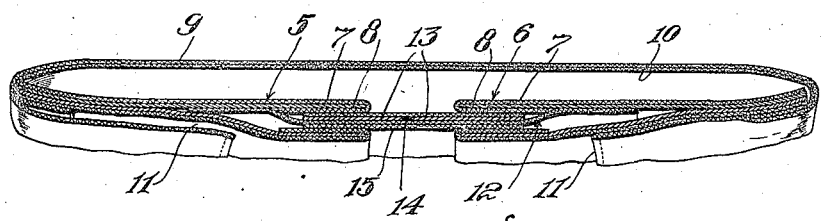
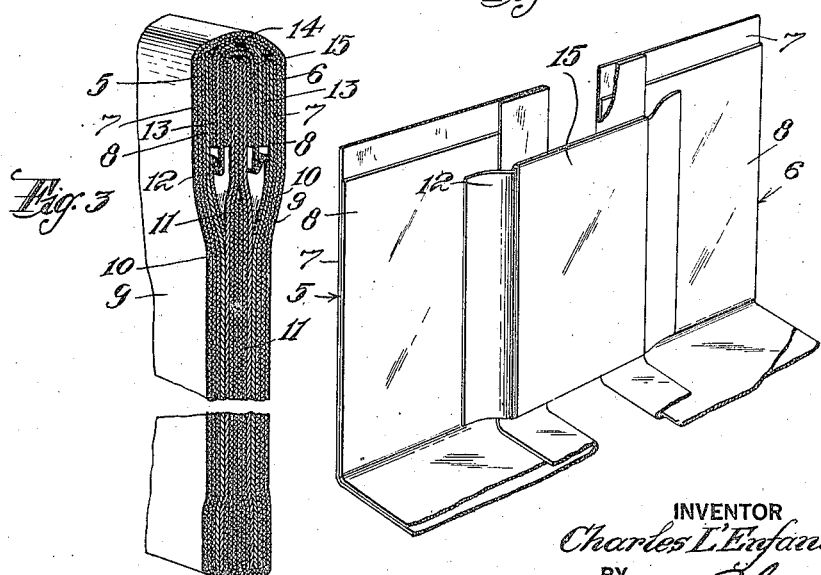
INVENTOR
Charles L'Enfant
BY C. P. Goepel
ATTORNEY

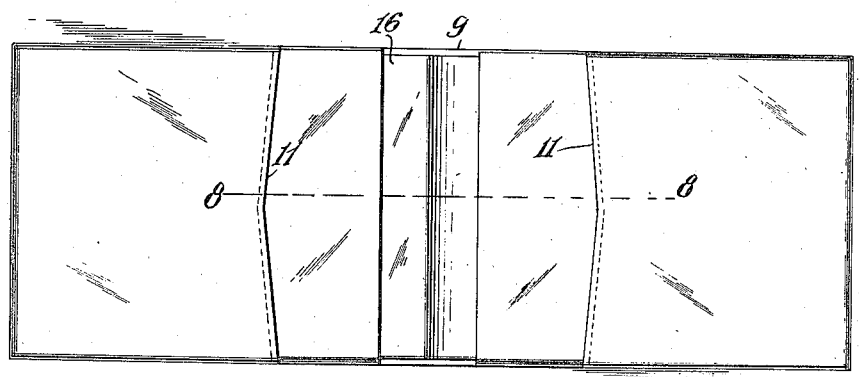
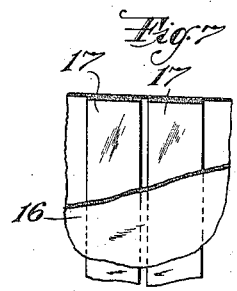
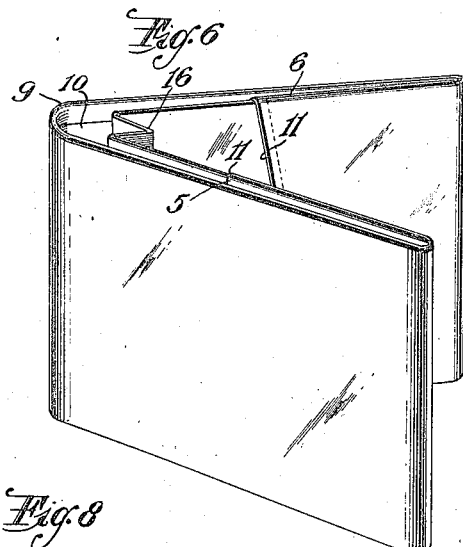
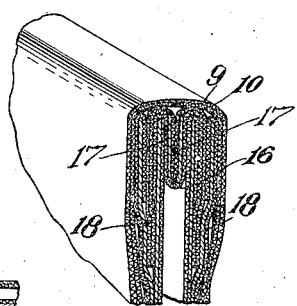
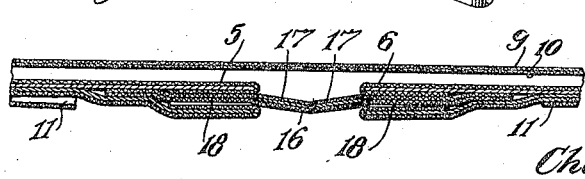

C. L'ENFANT.
BILL FOLD.
APPLICATION FILED AUG. 20, 1921.
1,423,669.
Patented July 25, 1922.
4 SHEETS—SHEET 3.
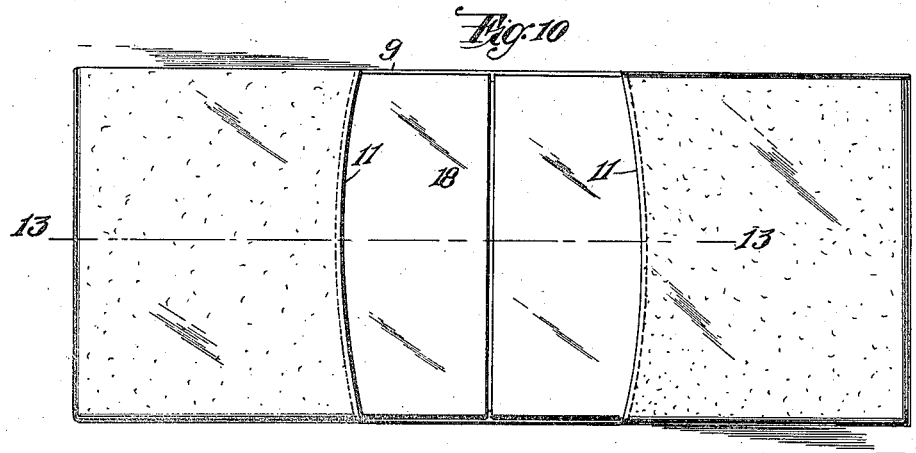
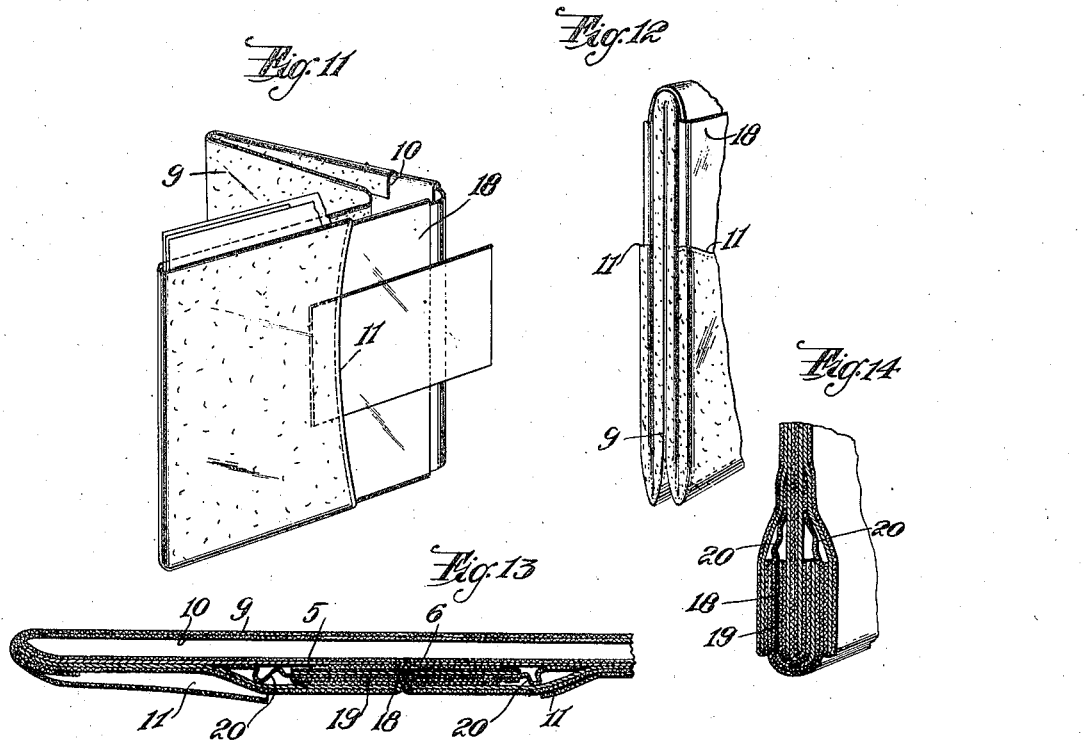
INVENTOR
Charles L'Enfant
BY
C. P. Goepel
ATTORNEY C. L'ENFANT.
BILL FOLD.
APPLICATION FILED AUG. 20, 1921.
1,423,669.
Patented July 25, 1922.
4 SHEETS—SHEET 4.
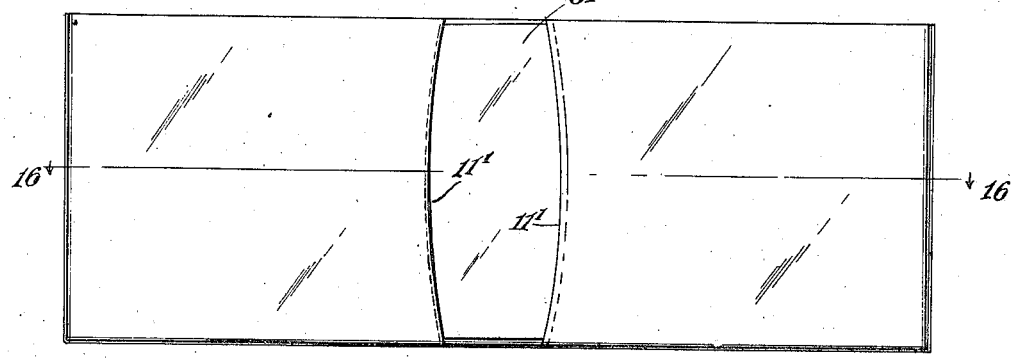
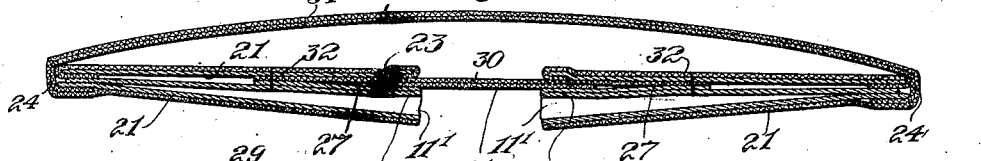
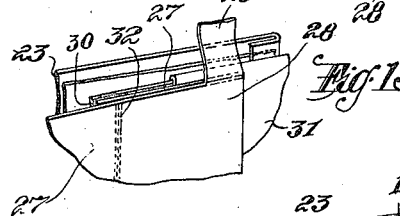
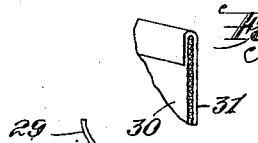
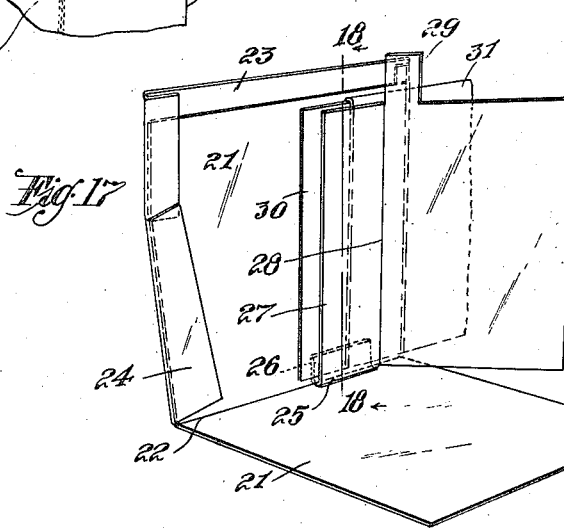
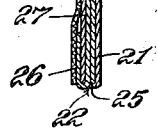
INVENTOR
Charles L'Enfant
BY
C. P. Goepel
ATTORNEY

UNITED STATES PATENT OFFICE.

CHARLES L'ENFANT, NEW YORK, N. Y.

BILL FOLD.

1,423,669. Specification of Letters Patent. Patented July 25, 1922.

Application filed August 20, 1921. Serial No. 493,779.

*To all whom it may concern:*

Be it known that I, CHARLES L'ENFANT, a citizen of the United States, and resident of New York city, in the borough of the Bronx, county and State of New York, have invented certain new and useful Improvements in Bill Folds, of which the following is a specification.

This invention relates to bill folds or similar articles as containers for bills, cards, receipts, or other memoranda. Generically considered, my present invention comprehends a bill fold of that general character in which a main longitudinally extending bill receiving pocket is provided and which is adapted to be folded or doubled upon itself, the primary object and purpose residing in the provision of certain novel features of construction which enables the article to be so folded even when a relatively large number of bills are contained in the pocket thereof without distortion or buckling of the flexible walls of the bill fold.

In the accompanying drawings illustrating the present invention I have disclosed several possible constructions whereby the desired end may be attained. A common characteristic of these several suggested constructions will be noted in that the inner wall of the bill fold is in two sections the opposed ends of which are spaced apart. A flexible connecting member is suitably secured at its ends to the spaced inner wall sections, said member being unattached or free from connection with the front wall of the bill fold and thereby providing a flexible connecting means which is foldable independently of the front wall of the bill fold when the latter is folded upon itself.

It is a further general object of my invention to provide a bill fold of the above description which may be manufactured at nominal cost and in the use of which a compartively large number of bills or other papers may be conveniently carried in the pocket without conspicuous bulkiness.

With the above and other objects in view, the invention consists in the improved bill fold and in the form, construction and relative arrangement of its several parts as will be hereinafter described and subsequently incorporated in the subjoined claims.

In the accompanying drawings wherein I have illustrated several practical and desirable embodiments of the invention and in which similar reference characters designate corresponding parts throughout the several views, Figure 1 is a perspective view illustrating one embodiment of my improved bill fold and showing the same open, Figure 2 is a longitudinal section, Figure 3 is a similar section showing the device folded upon itself, Figure 4 is a fragmentary sectional perspective view more clearly illustrating the principal features of construction, Figure 5 is an inner side elevation of a slightly modified construction showing the bill fold open, Figure 6 is a perspective view of the form shown in Figure 5, partly folded, Figure 7 is a fragmentary elevation parts being broken away showing the reinforcement for the foldable connecting member, Figure 8 is a longitudinal section taken on the line 8—8 of Figure 5, Figure 9 is a detail sectional perspective view illustrating the relation of the parts when folded, Figure 10 is a view similar to Figure 5 showing another alternative construction, Figure 11 is a perspective view of the latter form of the invention similar to Figure 6, Figure 12 is a fragmentary perspective view showing the device completely folded, Figure 13 is a section taken on the line 13—13 of Figure 10, Figure 14 is a sectional perspective view showing the folded relation of the parts.

Figure 15 is an elevation looking at the inner side of an extended bill fold and showing a preferred embodiment of the invention, Figure 16 is a longitudinal section taken on the line 16—16 of Figure 15, Figure 17 is a perspective view more clearly illustrating the construction of the inner wall sections of the bill fold, Figure 18 is a section taken on the line 18—18 of Figure 17, Figure 19 is a fragmentary perspective view, and Figure 20 is a sectional perspective view more clearly illustrating one feature of the construction.

Referring in detail to the drawings and more particularly to Figures 1 to 4 thereof, 5 and 6 respectively indicate the two sections of the inner wall of the bill fold. Each of these wall sections is constructed of a length of fabric 7 which is centrally folded upon itself, the said folds being reinforced by a sheet of paper or other suitable material indicated at 8, which is adhesively secured upon one side of the cloth sheet 7 before folding. The two folds of which each of the inner wall sections 5 and 6 is composed are unconnected at their inner ends, thereby providing a tubular inner end portion on each of said walls, the purpose of which will be presently explained.

Each of the inner wall sections 5 and 6 is of a length less than half the extended length of the bill fold and the ends of the folded fabric 7 constituting these wall sections, are securely stitched to one longitudinal edge of the outer wall 9 of the bill fold. This outer wall is of leather and has a fabric lining 10, the edges of the fabric wall sections 5 and 6 being secured between the leather wall 9 and its lining sheet. The end portions of the wall 9 are extended around the outer ends of the wall sections 5 and 6 inwardly longitudinally thereof and suitably secured along their longitudinal edges to said inner wall sections, thereby providing the pockets 11 in which cards or other articles may be conveniently carried.

The inner wall sections 5 and 6 when thus attached along their lower edges to the outer wall 9 of the bill fold have their inner opposed ends spaced apart as clearly seen in Figure 2 of the drawings. These spaced ends of the wall sections 5 and 6 are connected to each other by a relatively movable member. This member consists of a length of fabric 12 upon one side of which the transversely extending reinforcing strips of paper or cardboard 13 are secured. The inner opposed edges of these reinforcing strips are slightly spaced apart as at 14. A second sheet of fabric 15 is folded transversely around the fabric 12 and over the cardboard strips 13, the several parts being secured together by means of a suitable adhesive. The end portions of the fabric strip 12 extend a considerable distance beyond the side edges of the enveloping fabric strip 15 and the reinforcing strips 13. The central portion of the connecting strip 12 bridges the space between the opposed ends of the wall sections 5 and 6, and extends into the tubular portions of such wall sections between the folds thereof. The extremities of the fabric strip 12 are secured to the paper linings or reinforcements 8 of the wall sections 5 and 6, but it will be observed that a considerable portion of this fabric strip 12 between the attached extremities thereof and the reinforcements 13 is free or unattached. It will be apparent from this construction that the inner wall sections 5 and 6 and the connection between the opposed ends of these wall sections have more or less freedom for relative longitudinal movement. The connection between said wall sections extends approximately the entire width of the bill fold, but is unattached or free at both of its longitudinal edges from connection with the outer wall 9 of the bill fold.

In the use of a bill fold constructed in the manner above described, when a large number of bills are placed in the main pocket between the outer wall 9 and the inner wall sections 5 and 6 and the bill fold then folded upon itself so that the inner wall sections contact with each other, it will be evident that the fabric strips 12 and 15 of the connection between the inner wall sections will centrally fold and the portions of said fabric strips reinforced by the paper or cardboard 13 will be telescoped by the tubular portions of the wall sections 5 and 6 as the opposed ends of these wall sections move towards each other in the act of folding. This operation will be entirely clear from a comparison of Figures 2 and 3 of the drawings. As the lower edge of the connecting means between the wall sections 5 and 6 is not attached to the outer wall 9 of the bill fold, it is evident that no buckling of the material will occur to impede or obstruct the compact folding of the two halves of the bill fold upon each other. The loose or unattached portions of the fabric strip 12 between the secured ends thereof and reinforcements 13 may readily fold upon themselves in the space between the inner and outer portions of the wall sections 5 and 6, as seen in Figure 3 of the drawings. Heretofore, in devices of this character it has been possible to compactly fold the bill fold only when a relatively small number of bills are contained therein. Upon the attempt being made to fold a large number of bills in a case or folder of this character, the walls of the bill fold being continuous and stitched to each other throughout their lower longitudinal edges, would resist such folding and buckle upon themselves. This not only rendered the carrying of the bill fold in the pocket objectionable because of its bulk but also frequently resulted in a breaking of the stitches so that the bill fold was soon rendered unfit for further use. By means of my present improvement, however, these several objections are wholly overcome and a bill fold is provided in which a very large number of papers, cards, etc. may be carried, and which when folded will be of the smallest possible compass and will not be subjected to excessive strain in the frequent folding thereof.

In Figures 5 to 8 of the drawings, I have disclosed another embodiment of the invention wherein the inner wall sections of the bill fold while of substantially the same construction above described, are not provided with the tubular opposed end portions. In this construction the connection between the inner wall sections consists of a single piece of fabric 16 folded upon itself to enclose the spaced transversely extending reinforcing strips 17. The ends of the folded fabric are inserted between the inner and outer portions of the inner wall sections of the bill fold as shown at 18 in Figure 8 of the drawings and are immovably secured thereto by an adhesive or other suitable means. In this case, the outer longitudinal edges of the reinforcing strip 17 are substantially in line with the end edges of the wall sections. Thus when the bill fold is folded upon itself, as seen in Figures 6 and 9, the connection between said end sections will fold along a central line, the reinforced portions of such connection moving into close parallel relation to each other. It will be understood that the structure is shown upon a much exaggerated scale in the drawings and the two parts of the bill fold may be brought much closer together, in fact, until the wall sections 5 and 6 are in contacting relation to each other. It will be understood that in this construction likewise the foldable connection between said inner wall sections is not attached to the outer wall of the bill fold. I have found this construction quite desirable in practical use though it is not possible to carry as large a number of bills with the compact folding thereof, as in the construction first described.

In Figures 10 to 14 of the drawings, I have disclosed still another construction of the device wherein the body of the bill fold is of substantially the same construction first above referred to, the inner wall sections having tubular opposed end portions 18. In this case, however, the device is folded in the reverse direction to the folding of the previously described constructions. In other words, the inner wall sections move away from instead of towards each other while the two end portions of the outer body wall of the bill fold are brought into contact. In this latter construction the same reinforced connection between the two spaced body wall sections is provided. As seen in Figure 13, however, when the bill fold is in open or extended position the opposed ends of the relatively movable wall sections are in substantially abutting contact and the intermediate reinforced portion of the connection between said wall sections is substantially entirely enclosed within the tubular portions 18 thereof. This connecting means indicated at 19 at each side of the central reinforced portion thereof has a relatively long foldable fabric section 20 which is attached at its ends to the respective wall sections. Thus when the device is folded as shown in Figures 12 and 14, the reinforcing portion of the connection at each side of its center moves outwardly between the spaced portions of the respective wall sections instead of inwardly therebetween as is the case in the construction first described. In this embodiment of my invention I have indicated in Figures 11 and 12 one advantage thereof, that is, in addition to the tubular end portions of the spaced wall sections receiving the relatively movable connection therebetween they may also serve as additional pockets to receive cards, memoranda, slips or the like. In this construction likewise the flexible connecting means between the wall sections is entirely unattached to the outer body wall of the bill fold.

In Figures 15 to 20 inclusive of the drawings I have illustrated another construction which at the present time I deem preferable. In the embodiments of the invention above described, it will be noted that the cloth or fabric of the flexible connection between the inner wall sections of the bill fold is exposed when the two parts of the bill fold are in open or extended position. In the preferred construction, however, as shown in Figures 15 to 20 of the drawings, the pockets 11' extend the entire length of the inner wall sections of the bill fold and the foldable connection between these wall sections and in relation to which said wall sections have longitudinal movement embodies a sheet of leather preferably of the same color as the leather walls of the bill fold so that when the bill fold is arranged as in Figure 15 all of the visible walls or surfaces are of leather.

It is apparent that if the pockets 11' are made to extend the entire length of the inner wall sections in the structures heretofore described, in the insertion of cards or other articles into these pockets, there is the probability that the card will be inserted between the two parts of the wall section between which the foldable connection is engaged and would interfere with the proper folding of the fabric piece 12. In order to obviate this possibility I provide a sheet of relatively stiff linen 21 which is folded upon itself as at 22. To one portion of this folded sheet of linen and upon one side thereof a covering fabric sheet 23 is secured. The edge of this portion of the linen sheet 21 at the end of the bill fold is obliquely cut as at 24 and the fabric sheet 23 is turned inwardly over this end edge of the linen sheet and secured thereto by a suitable adhesive.

At the fold 22 in the linen sheet 21 a slit 25 is cut to receive an extension 26 on one end of a guard 27 which is also formed of relatively stiff linen. This piece of linen has a fold 28 therein and at one end of this fold the tab or extension 29 is provided. The extension 26 is adapted to extend between the linen sheet 21 and the fabric covering sheet 23 and is adhesively held in place.

The connection between the inner wall sections consists of a length of fabric 30 secured to one side of a sheet of leather 31. The fabric is of considerably greater length than the leather and has its ends disposed between the linen sheet 21 and the inwardly folded portion 28 of the guard 27. Preferably, the fabric 30 is adhesively secured to the linen sheet in spaced relation to the edge of the leather 31 and in addition, the folded portion of the guard 27 and the end of the fabric 30 are secured to the linen sheet 21 and the fabric 23 by means of a line of stitching indicated at 32. When the guard 27 is secured in place in this manner, it will be seen that the fold 28 thereof at its edge lies closely against the leather 31 while permitting of the free relative movement of the inner wall sections and the flexible connections so that the fabric strip 30 may fold upon itself at its end portions. The outer or front wall of the bill fold consists of the sheet of leather 33 having a fabric lining 34, the leather extending over the other or inner portion of the folded linen sheet 21 and being adhesively or otherwise secured thereto. The upper longitudinal edge of the leather 34 constituting the facing sheet of the pocket wall is stitched or otherwise secured along its longitudinal edge at the open side of the bill fold to the edge of the fabric sheet 23 and to the tab or extension 29 which is interposed between the leather and the fabric. Thus the inner lining sheet of linen 21 and the guard sheet 27 overlying the ends of the leather strip 31 provide smooth walls for the pockets 11' between which the cards or other articles may be readily inserted. In this manner, I provide leather facings extending for the full length of the inner wall sections of the bill fold, the fabric 30 being invisible when the bill fold is open or extended. Preferably, the leather 31 is of the same grade and color as the leather facing sheet for the walls of the bill fold.

From the foregoing description considered in connection with the accompanying drawings, the construction and manner of operation of the several embodiments of the invention may be readily understood. The device as herein described is simple and durable in its construction and may be manufactured at comparatively small cost. It will be apparent that by means of my improvements, the capacity of such bill folds and, therefore, its practical utility, is greatly enhanced and the deficiencies inherent in devices of this character as heretofore produced have been entirely overcome. It is apparent that the bill fold may be made in numerous different shapes and sizes and that various materials other than those above referred to might be employed in its construction. While I have herein described and illustrated several embodiments of the invention, it is manifest that the device might be constructed to attain the same results in other alternative forms and I accordingly reserve the privilege of adopting all such legitimate changes as may be fairly embodied within the spirit and scope of the invention as claimed.

I claim:

1. A bill fold comprising body walls, one of said walls consisting of two sections disposed in alignment and having their inner opposed ends spaced apart and means permanently connecting the opposed ends of said wall sections to each other and foldable upon itself when said wall sections are moved into parallel relation to each other, said connecting means during the folding thereof permitting of the relative longitudinal movement of said wall sections toward and from each other with respect to said connecting means.

2. A bill fold comprising body walls, one of said walls consisting of two aligned sections spaced apart at their opposed ends and secured to one longitudinal edge of the other body wall, and foldable connecting means between said wall sections unattached to the other body wall and permitting of the movement of the opposed ends of said wall sections towards and from each other in the folding and opening movements of the bill fold.

3. A bill fold comprising body walls, one of said walls consisting of two sections attached along one of their longitudinal edges to the other wall and having opposed tubular end portions spaced apart, and foldable connecting means permanently attached to said wall sections and extending within the tubular end portions thereof.

4. A bill fold comprising body walls, one of said walls consisting of two sections attached along one of their marginal edges to the other body wall and having opposed tubular end portions spaced apart, and a flexible connection between said wall sections unattached to the other body wall and having a reinforced intermediate portion telescopically engaged in the tubular ends of said wall sections.

5. A bill fold comprising body walls, one of said walls consisting of two sections attached along one of their marginal edges to the other body wall, each of said wall sections having a pocket extending the full length thereof, a flexible connection between said wall sections consisting of a length of fabric attached at its ends to the inner walls of said pockets and a leather sheet secured to one side of the fabric and extending at its opposite ends into said pockets but terminating in spaced relation to the ends of the fabric sheet, a leather facing sheet for the other walls of said pockets, and a guard sheet of relatively stiff material arranged in each of said pockets and secured to the inner wall thereof, and overlying the free end portion of the fabric and the edge of the leather sheet of the flexible connection between said wall sections.

6. A bill fold comprising an outer body wall and inner wall sections constituting continuations of said outer wall and extending longitudinally from opposite ends thereof, said inner wall sections having their opposed ends spaced apart and being secured along their lower longitudinal edges to the outer wall, and a foldable part unattached to the outer body wall and bridging the space between the opposed ends of said inner wall sections.

7. A bill fold having an outer body wall and inner wall sections formed from a single sheet of material and said inner wall sections spaced apart at their opposed ends and secured along their lower longitudinal edges to the outer body wall, and a foldable part unattached to the outer body wall and bridging the space between the ends of said inner wall sections, said foldable part being connected at its ends to said inner wall sections.

In testimony that I claim the foregoing as my invention, and I have signed my name hereunder.

CHARLES L'ENFANT.